Oct. 16, 1934.  H. G. PAPE  1,976,962
FISH FEEDING DEVICE
Filed Jan. 12, 1933
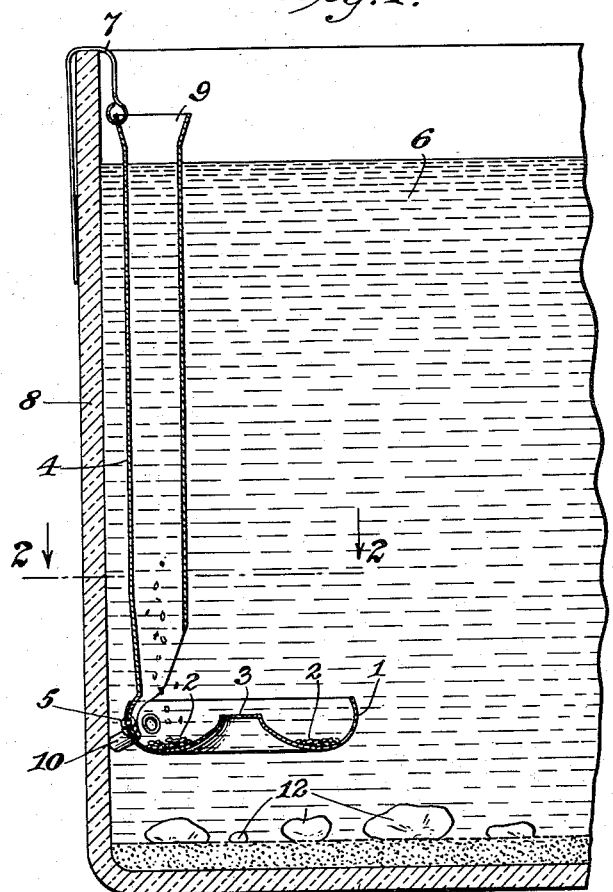
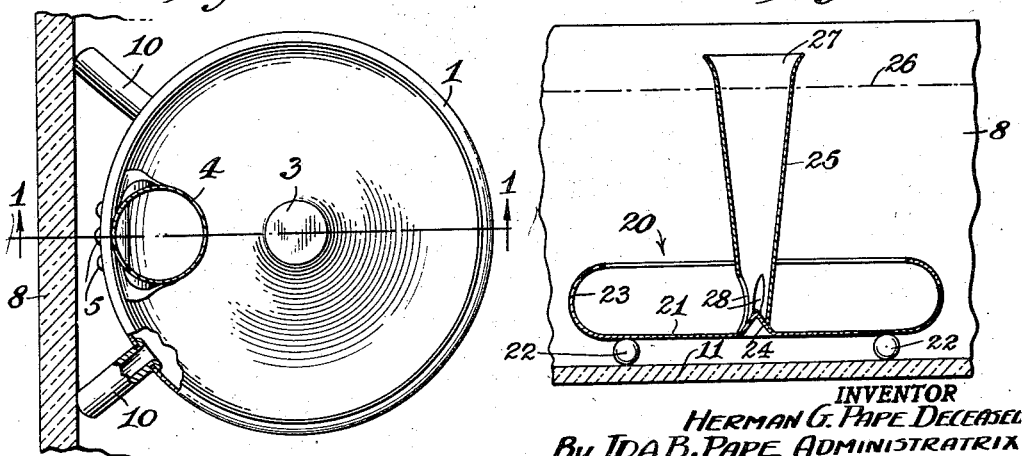
INVENTOR
HERMAN G. PAPE DECEASED
By IDA B. PAPE ADMINISTRATRIX
By Henry Van Arsdale
ATTORNEY.

Patented Oct. 16, 1934

1,976,962

UNITED STATES PATENT OFFICE 1,976,962

FISH FEEDING DEVICE

Herman G. Pape, deceased, late of New York, N. Y., by Ida B. Pape administratrix, New York, N. Y.

Application January 12, 1933, Serial No. 651,318

5 Claims. (Cl. 119—52)

This invention relates to fish food dispensing devices and particularly to such as are adapted for use in aquariums, tanks, pools, etc., and is a continuation in part of an application filed August 14, 1931, by Herman G. Pape, (now deceased) for Fish feed trough, Serial No. 557,074.

One of the difficulties in feeding fish hitherto encountered is, that the dry flaky food commonly used, after becoming saturated when dispensed within such bodies of water, sinks to the bottom where it is not easily obtained by the fish and decomposes or rots, producing a filthy, malodorous mass difficult to cleanse from the floor of the aquarium, tank, pool or the like. This condition is particularly aggravated if the floor is covered with gravel, growing plants, or other foreign things, rendering it substantially impossible to thoroughly cleanse the interior of the food refuse.

It is also very desirable that certain foods be well water soaked before being consumed by the fish; that the food be readily accessible to the fish, and that the food be conserved against loss and waste.

It is therefore one of the objects of the present invention to provide a fish feeding device which is especially well suited to household aquariums as well as to larger aquariums, tanks, pools, and the like, and a fish feeding device which insures that the food will be well soaked before being consumed; permits the fish to have ready and easy access thereto; and keeps the food away from the bottom of the aquarium and from foreign objects therein; conserves the food against loss and waste, and may be replenished with food easily and conveniently.

A further feature is in the provision of a fish feeding device of the character described having all parts, edges, corners, etc., jointed, rounded or smooth finished, so as to protect the fish, particularly their delicate fins, veil tails, extended feelers, and the like, against suffering injury when coming in contact with the device.

A further feature is in the provision of food receiving means for guiding the food in such manner that it will positively enter a feed trough without loss or waste and insuring the soaking of the food, and the provision of a trough adapted to hold the food readily accessible to the fish and in which food of any nature is confined until entirely consumed without waste and against being readily washed or fanned out by the movements of the fish or normal water currents.

Other objects of this invention, such as simplicity, attractive appearance, lasting quality, and moderate cost of construction, will be in part obvious and in part pointed out hereinafter.

In accordance with this invention the device includes a feed trough so shaped as to positively confine food therein against being washed out by the normal water turbulence caused by the fish or by the natural water currents, and preventing any food from settling on the bottom of an aquarium or pool in which the trough is submerged, while at the same time permitting the fish to feed readily and conveniently from the trough, in combination with a conduit, such as a tube, extending from above the water level all the way into and joining the trough, so that food inserted into the upper end of the tube will be conducted positively all the way into the trough and will have been well soaked in the meantime. Any suitable means, such as feet on the trough, or an attachment device on the tube adapted to engage a wall of the aquarium, may be provided to support the device in proper position in the aquarium, pool, or the like, preferably with the upper end of the tube disposed above the water level and distended to permit food to be supplied easily and conveniently without disturbing the device in any way.

In order that a clearer understanding of this invention may be had attention is hereby directed to the accompanying drawing, forming a part of this application, and illustrating certain possible embodiments of this invention, and in which:—

Fig. 1 is a fragmentary sectional view taken on the line 1—1 of Fig. 2 of a conventional type of aquarium partially filled with water, and having a fish feeding device embodying this invention in place therein;

Fig. 2 is a sectional view thereof and is taken on the line 2—2 of Fig. 1; and

Fig. 3 is a sectional view of a modified type of fish feeding device embodying this invention in association with an aquarium.

Similar reference characters refer to similar parts throughout the several views of the drawing.

As shown Figs. 1 and 2, the feed trough consists of a bowl made of suitable material having a curved side 1 suitably high to prevent food 2 therein from being washed out by the normal water turbulence caused by the fish or by natural water currents, but not so high or curved relative to the diameter of the bowl as to interfere with the fish having free access to the food therein or feeding freely therefrom. Preferably the bottom of the bowl has a raised portion 3 at the center, which serves to spread the food so that it will be more readily accessible to the fish than would be the case if the food were bunched together at the center. The raised portion 3 also tends to prevent the food from being washed out of the bowl, particularly in combination with the curved inturned side 1.

A feed tube 4 is secured to one side of the bowl by any suitable means appropriate for the materials of which the bowl and tube are made, for instance rivets 5. Tube 4 extends upwardly from the trough to above the level of the water 6 in the aquarium in which the device is disposed. The device may be supported in position by a pliable wire 7 secured at one end to the tube 4 and bent over and engaging the top of a side wall of the aquarium. The upper end of the tube is preferably flared, as at 9, to facilitate the introduction of the fish food, and the lower end of the tube may be cut or formed to have an opening biased toward and extending into the bowl. If desired, spacer knobs or studs 10, may be secured to the trough on opposite sides of the tube juncture, as by riveting, as shown, which keep the trough some distance from the aquarium wall, keep the tube and trough level and steady the device against swinging or moving about in the water, and thus helping to maintain the food in the trough, since if the trough were tilted or if the device were to swing or move in the water the food would be more likely to wash or fall out of the trough and settle to the bottom of the aquarium. The spacers also tend to relieve the strain somewhat on the joint between the tube and trough.

The pliable wire 7 permits the positioning of the device at various levels, as desired, and the placement of the trough at the desired height relative to the bottom 11 of the aquarium and to the objects 12, such as sand, gravel, plants, etc., in the aquarium.

The feeding device shown in Fig. 3, has a bowl-shaped trough 20 having a bottom 21 provided with feet 22 whereby the trough is supported above the bottom 11 of the aquarium. The trough has a curved and inturned food-confining side 23 and a raised portion 24 at the center of the bottom to which the lower end of a feed tube 25 is secured. Tube 25 extends upwardly to above the water level, indicated at 26, and its top 27 is distended to facilitate introduction of food. There are openings 28 at or adjacent the lower end of the tube and within the confines of the trough, so that food fed into the top of the tube will first be well soaked while passing to the openings 28 and then will be positively and directly deposited within the trough 20. The tube at the center of the bowl co-operates with the sides of the bowl in preventing water currents and eddies from washing food from the trough, being functionally similar in this respect to the co-operation between the sides of the trough illustrated in Fig. 1, and the raised center portion 3 of that trough.

The tube 25 and feet 22 may be secured to the bowl 20 by any suitable means appropriate to the materials of which these elements are made, for instance riveting, fusing, soldering, etc. The same applies also to the attachment of the tube 4 and the spacers 10 to the bowl of the device shown in Figs. 1 and 2. Also it may be perfectly possible and satisfactory to make either form of the device, which forms have been shown merely for the purpose of illustration, or other forms of devices embodying this invention, in one piece, or in several pieces secured together, for instance in ceramic ware, glass, pyroxylin ware, etc., it being distinctly understood that this invention is not limited to any specific material or to the number of pieces employed in the construction or any specific means of securing such pieces together. Preferably however, the tube and trough should be opaque or semi-opaque so that the fish will see them clearly and will not be so apt to dash into them when swimming or when rushing about or becoming frightened and seeking to escape.

Although the improvements have been described with considerable detail and with respect to certain particular forms of the invention it is not desired to be limited to such details since many changes and modifications may well be made without departing from the spirit and scope of the invention in its broadest aspect.

Having thus described the invention, what is claimed as new and desired to secure by Letters Patent, is:—

1. A fish feeding device of the character described and comprising a unitary article adapted to be used in a household aquarium and including a feed trough portion having a bottom and provided with means, comprising an upwardly and inwardly curved peripheral wall, preventing fish food from being washed out of the trough by the normal water turbulence in the aquarium, the bottom of the trough portion being wide relative to the height of said wall and affording the fish in the aquarium ready access to food in said trough portion, and a feed tube portion extending upwardly from said trough portion, secured at its lower end to said trough portion and relatively long, the upper end of said tube portion being adapted to be above the surface of the water in the aquarium, and an opening at the lower end of said tube portion and having a sidewise aspect thereto and discharging directly into said trough portion.

2. A fish feeding device of the character described and comprising a unitary article adapted to be used in a household aquarium and including a feed trough portion having a bottom and provided with means, comprising an upwardly and inwardly curved peripheral wall, preventing fish food from being washed out of the trough by the normal water turbulence in the aquarium, the bottom of the trough portion being wide relative to the height of said wall and affording the fish in the aquarium ready access to food in said trough portion, and a feed tube portion extending upwardly from said trough portion and having an obliquely cut open lower extremity disposed over the bottom of the trough, the lower edge of said tube portion extremity being secured to said trough wall, whereby fish food flowing down through said tube is discharged directly into said food trough portion.

3. A fish feeding device of the character described and comprising a unitary article adapted to be used in a household aquarium and including a feed trough portion having a bottom and provided with means, comprising an upwardly and inwardly curved peripheral wall, preventing fish food from being washed out of the trough by the normal water turbulence in the aquarium, the bottom of the trough portion being wide relative to the height of said wall and affording the fish in the aquarium ready access to food in said trough portion, and a feed tube portion extending upwardly from said trough portion and having an obliquely cut open lower extremity disposed over the bottom of the trough, the lower edge of said tube portion extremity being secured to said trough wall, whereby fish food flowing down through said tube is discharged directly into said food trough portion, said trough bottom having a central raised portion whereby the fish food delivered by said tube portion is caused to be spread about the bottom of the trough portion.

4. A fish feeding device of the character described and comprising a unitary article adapted to be used in a household aquarium and including a feed trough portion having a bottom and provided with means, comprising an upwardly and inwardly curved peripheral wall, preventing fish food from being washed out of the trough by the normal water turbulence in the aquarium, the bottom of the trough portion being wide relative to the height of said wall and affording the fish in the aquarium ready access to food in said trough portion, and a feed tube portion extending upwardly from said trough portion and having an obliquely cut open lower extremity disposed over the bottom of the trough, the lower edge of said tube portion extremity being secured to said trough wall, whereby fish food flowing down through said tube is discharged directly into said food trough portion, and means, comprising members on and protruding side-wise from the food trough portion and adapted to engage a side of an aquarium against which the device is disposed, whereby the feed trough portion is steadied against being swayed by the normal water turbulence in the aquarium, and the washing of food out of the trough portion by such swaying of the trough is prevented.

5. A fish feeding device of the character described and comprising a unitary article adapted to be used in a household aquarium and including a feed trough portion having a bottom and provided with means, comprising an upwardly and inwardly curved peripheral wall, preventing fish food from being washed out of the trough by the normal water turbulence in the aquarium, the bottom of the trough portion being wide relative to the height of said wall and affording the fish in the aquarium ready access to food in said trough portion, and a feed tube portion extending upwardly from said trough portion and having an obliquely cut open lower extremity disposed over the bottom of the trough, the lower edge of said tube portion extremity being secured to said trough wall, whereby fish food flowing down through said tube is discharged directly into said food trough portion, said trough bottom having a central raised portion whereby the fish food delivered by said tube portion is caused to be spread about the bottom of the trough portion, and means, comprising members on and protruding side-wise from the food trough portion and adapted to engage a side of an aquarium against which the device is disposed, whereby the feed trough portion is steadied against being swayed by the normal water turbulence in the aquarium, and the washing of food out of the trough portion by such swaying of the trough is prevented.

IDA B. PAPE,
*Administratrix of Herman G. Pape, Deceased.*